United States Patent
Elum et al.

(10) Patent No.: US 8,042,524 B2
(45) Date of Patent: Oct. 25, 2011

(54) EMISSION CONTROL DEVICES FOR AIR INDUCTION SYSTEMS OF INTERNAL COMBUSTION ENGINES

(75) Inventors: Maurice J. Elum, Roanoke, VA (US); William B. Leedy, Mooresville, NC (US); James R. Miller, Roanoke, VA (US); Caleb S. Loftin, Raleigh, NC (US)

(73) Assignee: Meadwestvaco Corporation, Richmond, VA (US)

( * ) Notice: Subject to any disclaimer, the term of this patent is extended or adjusted under 35 U.S.C. 154(b) by 371 days.

(21) Appl. No.: 12/403,902

(22) Filed: Mar. 13, 2009

(65) Prior Publication Data
US 2010/0018506 A1    Jan. 28, 2010

Related U.S. Application Data

(60) Provisional application No. 61/083,988, filed on Jul. 28, 2008.

(51) Int. Cl.
*F02M 33/04* (2006.01)
*F02M 33/02* (2006.01)

(52) U.S. Cl. ...................................... 123/518
(58) Field of Classification Search ............ 123/518, 123/519, 520, 516, 198 D, 198 E, 184.57, 123/704; 55/495, 496, 507, 385.3; 95/146; 60/311

See application file for complete search history.

(56) References Cited

U.S. PATENT DOCUMENTS

| 6,645,271 B2 * | 11/2003 | Seguin et al. ............... 95/90 |
| 6,692,551 B2 | 2/2004 | Wernholm et al. |
| 7,168,417 B2 | 1/2007 | Arruda et al. |
| 7,222,612 B2 | 5/2007 | Hagler et al. |
| 2003/0116021 A1 | 6/2003 | Oda et al. |
| 2005/0284298 A1 | 12/2005 | Hirata |

FOREIGN PATENT DOCUMENTS

| CA | 993 809 B | 7/1976 |
| CA | 2 329 451 A1 | 6/2001 |
| CA | 2 610 733 A | 7/2006 |
| WO | WO 2004/101115 A1 | 11/2004 |

* cited by examiner

*Primary Examiner* — Mahmoud Gimie
(74) *Attorney, Agent, or Firm* — MWV Intellectual Property Group (57) ABSTRACT

An emission control device for an air induction system of an internal combustion engine having high adsorption capacity, yet low flow resistance is disclosed. The AIS emission control device comprises a first case including an outlet-opening connected to an intake manifold of the engine; a second case including an inlet-opening for the intake air; and an adsorbent element positioned in a plane across the intake airflow, wherein the adsorbent element has an opening area such that the control device has a pressure drop of less than about 1 inch $H_2O$ at the air flow rate of about 300 cfm and % reduction in vapor emission of at least about 75% after one day of the vapor generation rate of about 220 mg/day.

17 Claims, 14 Drawing Sheets

EMISSION CONTROL DEVICES FOR AIR INDUCTION SYSTEMS OF INTERNAL COMBUSTION ENGINES

This non-provisional application relies on the filing date of provisional U.S. Application Ser. No. 61/083,988 filed on Jul. 28, 2008, having been filed within twelve (12) months thereof, which is incorporated herein by reference, and priority thereto is claimed under 35 USC § 1.19(e).

BACKGROUND OF THE DISCLOSURE

An increase in environmental concerns has continued to drive strict regulations of the hydrocarbon emissions from automotives into the environment, even when the vehicle is not operating. The great majority of internal combustion engines in use today are fuel-injected engines. When a fuel-injected engine is switched off after use, a small amount of residual fuel volatilizes and escapes from the injector tips. While a vehicle is sitting over time after use, this evaporated fuel may pass outwardly through the intake manifold, the intake air ducts and air filter, and may escape into the atmosphere, thus contributing to air pollution. Therefore, it would be desirable to minimize this type of inadvertent evaporative emissions leakage.

Several approaches have been used to control the hydrocarbon vapors escaped from the intake manifold after engine shutdown.

An engine's electronic throttle control may be used to close the intake manifold at the engine shutdown, and thereby minimizing the hydrocarbon emission to the atmosphere. However, this approach may impair the desirable option of a so-called "limp-home" mode in which a vehicle may be driven in the event of a partial failure of the engine electronics control system. For systems with mechanical throttle control, it is difficult and expensive to completely seal the intake manifold and thereby preventing the escape of hydrocarbon vapors from the manifold to the atmosphere.

U.S. Pat. No. 7,168,417 describes a hydrocarbon trapping device for an engine's air intake system including a conduit pressed fit into the air duct, a carbon adsorbent sheet extending substantially completely around the inner perimeter of the conduit, and a retainer extending from the inner surface of the conduit to retain the side edge of the absorbent sheet. Unfortunately, the approach is only partially successful because the hydrocarbon vapor laden air can escape the manifold without being brought into proximity with a carbon adsorptive surface. As a result, relatively large areas of carbon sheeting are required to ensure that an adequate quantity of the laden air comes into contact with the carbon adsorptive surface.

U.S. Pat. No. 6,692,551 discloses an air intake emission control system for controlling the hydrocarbon emission having a rigid carbon monolith adsorbent disposed in a conduit connecting between an air box and an atmospheric air intake port. The carbon monolith is, however, brittle and vulnerable to breakage due to incidental impact during handling and installation. Vibration during engine operation or vehicle travel over non-smooth road surfaces may also result in damage during use. Such damage may dislodge particles that restrict air flow to the engine or are drawn into the intake manifold and potentially adversely affect engine operation. Furthermore, the monolith structure creates a large and undesirable flow restriction (i.e. pressure drop) in the intake air flow path due to a large cross-sectional area of its structure and its relatively small-diameter air passages. It is desirable to have an emission control system for the intake manifold with minimum air flow resistance, since both engine performance and fuel efficiency can be adversely affected by the flow restriction.

U.S. Pat. No. 7,222,612 describes a low-resistance hydrocarbon-adsorptive cartridge for an air intake of an internal combustion engine comprising a structure for being mounted into a portion of an engine air intake system. The structure is adapted to orient and retain one or more thin sheets of activated carbon sheeting in the intake system. The plurality of sheets is oriented such that the leading edge of each sheet is presented to the engine intake air stream, thereby minimizing reduction in total cross-sectional area of the intake system.

Several AIS emission control devices currently used in an automotive industry rely on passing the contaminant-laden air through a carbon adsorbent element with particular limited design. The contaminant-laden air flows through the carbon adsorbent element located in the air box, and the hydrocarbon vapors are adsorbed onto the carbon adsorbent. Unfortunately, these flow-through air intake emission control devices have high flow restriction (i.e., pressure drop) in the intake air flow path, and both engine performance and fuel efficiency can be adversely affected by the high flow restriction. Furthermore, these devices have limited adsorption efficiency for the hydrocarbon vapors.

Accordingly, there is a need for an AIS emission control device capable of reducing the leak of hydrocarbon vapors from the engine's intake manifold into the atmosphere during engine shutdown that has enhanced hydrocarbon adsorption capacity and efficiency; minimum air flow resistance with the device present in the air induction system; and sufficient strength to sustain the structural integrity during installation and operation of the vehicle.

SUMMARY OF THE DISCLOSURE

An emission control device for an air induction system of an internal combustion engine having high adsorption capacity, yet low flow resistance is disclosed. The disclosed AIS emission control device comprises a first case including an outlet-opening connected to an intake manifold of the engine; a second case including an inlet-opening for the intake air; and an adsorbent element positioned in a plane across the intake airflow and located on the first case or the second case, wherein the adsorbent element has an opening area such that that control device has a pressure drop of less than about 1 inch $H_2O$ at the air flow rate of about 300 cfm and % reduction in vapor emission of at least about 75% after one day of the vapor generation rate of about 220 mg/day.

DESCRIPTION OF THE DISCLOSURE

The present disclosures now will be described more fully hereinafter, but not all embodiments of the disclosure are shown. While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof.

Figure 1:
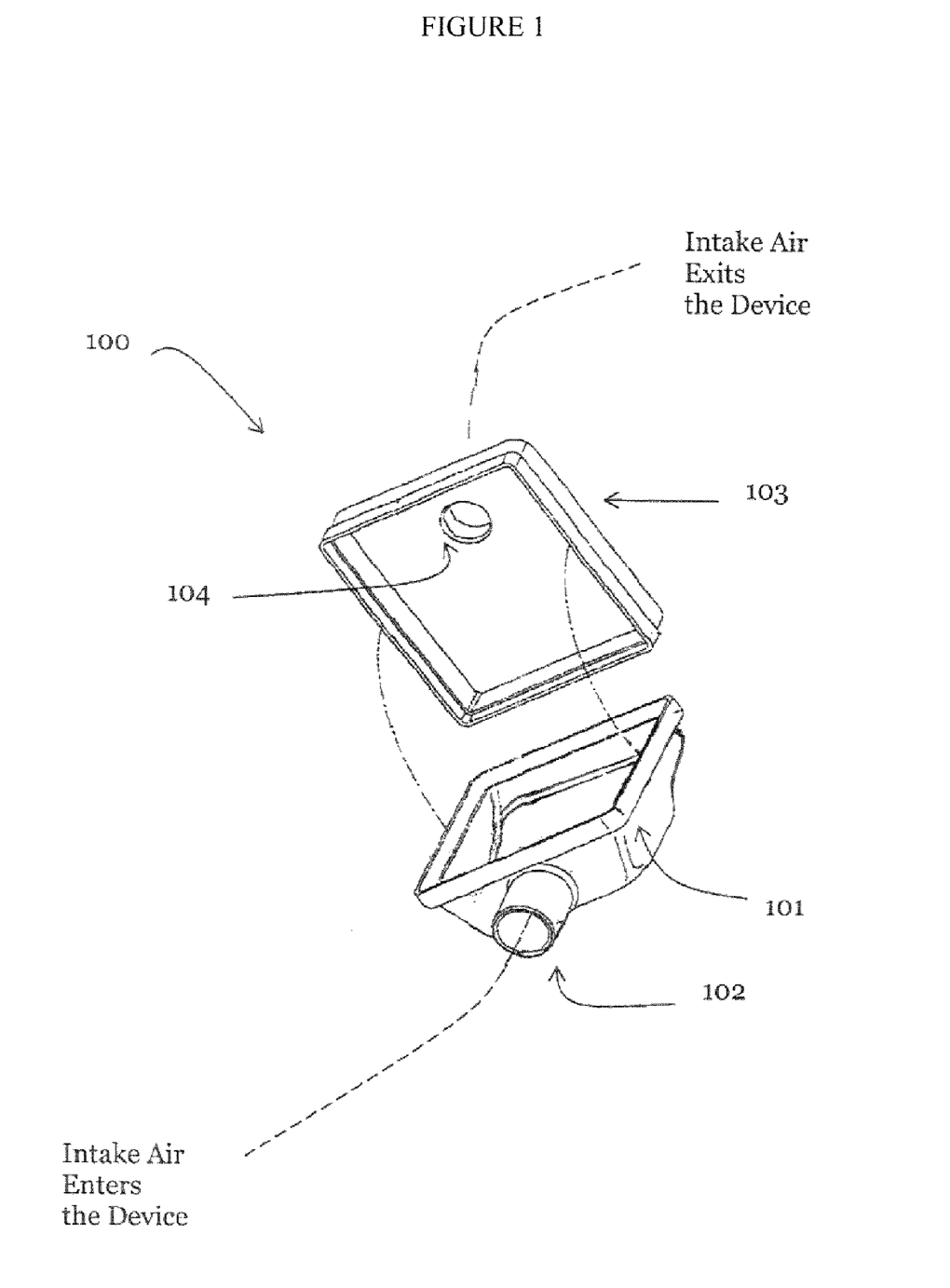
FIG. 1 shows an isometric view of an example airbox.

FIG. 1 shows one example of an airbox commonly used in an AIS system of automotive internal combustion engine. The airbox 100 may include a first case 101 having an opening 102 for intake air, and a second case 103 having an opening 104 connected to an intake manifold of an engine. The airbox may further include a filter for removing particulate matters from a fluid stream during an operation of the internal combustion engine.

Figure 2:
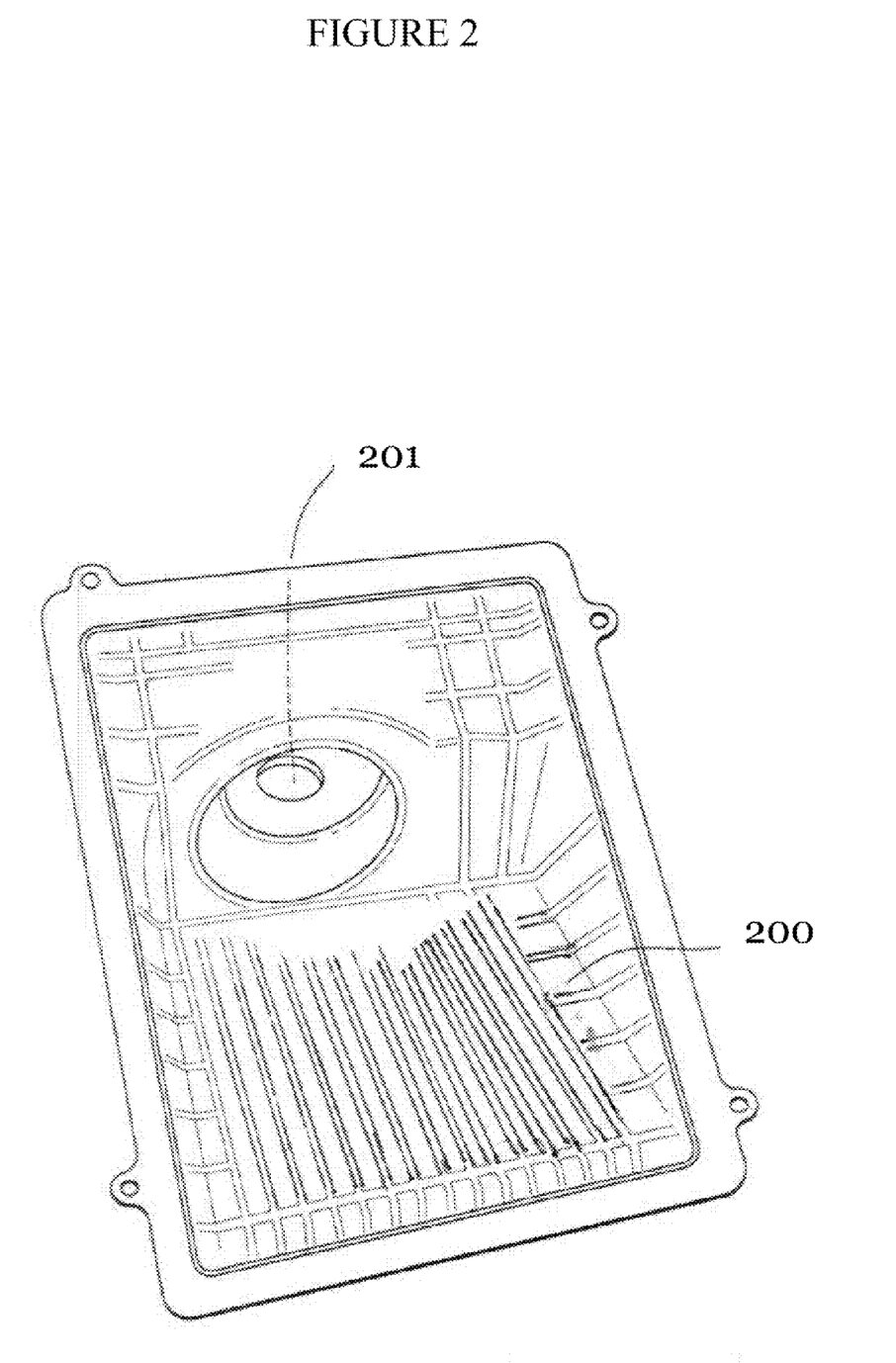
FIG. 2 shows a cross section of an example airbox, illustrating a case and an inlet-opening for an intake air passage.

FIG. 2 shows a cross section of a typical airbox, showing a case 200 with having an outlet-opening 201 for an intake air.

The disclosed AIS emission control device comprises:
(a) a first case having an outlet-opening connected to an intake manifold of an engine;
(b) a second case having an inlet-opening for an intake air; and
(c) an adsorbent element positioned in a plane across the intake airflow wherein the adsorbent element has an opening area such that the device has a pressure drop of less than about 1 inch H₂O at the air flow rate of about 300 cfm and a % reduction in vapor emission of at least about 75% after one day of the vapor generation rate of about 220 mg/day.

When desired, the disclosed emission control device may further include a filter for removing particulate matters from a fluid stream during an operation of the internal combustion engine.

U.S. Pat. No. 7,222,612 describes the desirability of low flow restriction and sufficient carbon sheet area to give a high probability of hydrocarbon vapor contact with the sheet. The approach is to have small distances between a plurality of parallel sheets relative to the length of the sheets in the flow direction. The present disclosure uses the opposite approach of a negligible length of sheet in the path through which the air flows. Despite the limitations previously cited in the U.S. Pat. No. 7,222,612, high efficiency of vapor removal during engine-off periods and low flow restriction during engine-on periods is achieved in the present disclosure with relatively large distances, rather than small distances, in the filter openings for air flow and relatively short distances in the direction of the flow path.

During engine operation, the air stream enters into the disclosed AIS emission control device through the inlet opening; flows through the adsorbent element; and finally exits the disclosed device through an outlet-opening that is in fluid communication with an engine combustion chamber or chambers through a carburetor or intake manifold. In this manner, the intake air will flow through the disclosed device prior to being introduced to a combustion chamber. After the engine shutdown, the contaminant-laden air stream from the combustion chamber may backflow through into the disclosed device. Any hydrocarbons vapor accumulating in the disclosed AIS control device or migrating from the intake manifold will pass through the adsorbent element, and the hydrocarbon vapors in the contaminant-laden air are adsorbed onto the adsorbent element before the treated air is discharged to the atmosphere. Once the engine is turned on, fresh air from the external environment flows into the disclosed AIS emission control device, desorbs some of the previously adsorbed hydrocarbons on the adsorbent element, and carries these hydrocarbon vapors through to the combustion chamber, wherein the fluid will be combusted along with the fuel.

Figure 3:
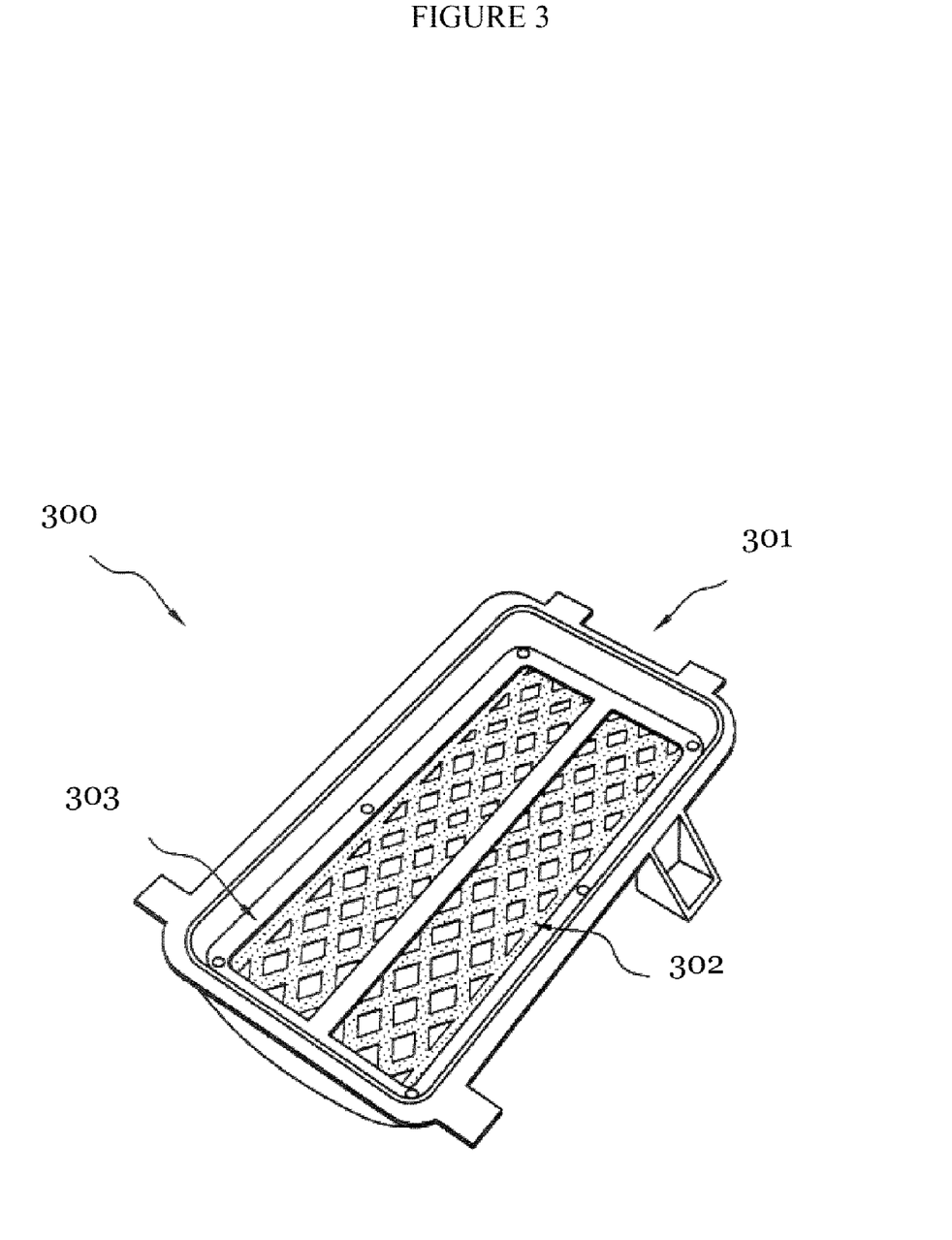
FIG. 3 shows a cross section of one embodiment of the disclosed AIS emission control device, illustrating a lower case with an inlet-opening for an intake air passage, an adsorbent sheet with a lattice pattern positioned on top on the lower case, and a frame securing the adsorbent sheet onto the lower case.

FIG. 3 illustrates the cross section of one embodiment of the disclosed emission control device. A case 300 has an inlet-opening 301 connected to the intake air duct system, an adsorbent element 302 placed on top of the case, and a frame 303 securing the adsorbent element 302 onto the case 300. The adsorbent element 302 may be an adsorbent sheet having a lattice pattern as shown. The contaminant-laden air stream enters the air induction system during engine-off periods, by methods including, but not limited to, diffusion and convection. The adsorbent element 302 will adsorb contaminants in the stream, resulting in a decrease in the level of contaminants in the stream exiting the air induction system. The adsorption process is driven by the chemical potential difference of the contaminant between the air stream and the adsorbent.

The adsorbent element of the disclosed AIS emission control device is positioned in a plane across the intake airflow to enhance the fuel adsorbent efficiency during engine-off periods, while including an opening area to minimize the pressure drop while the engine is running. Based on the desired application, the disclosed AIS emission control device may be designed accordingly to optimize the fuel adsorption efficiency, while minimizing pressure drop. Several structures of the adsorbent element may be used in the emission control device of the present disclosure, so long as it includes an open area such that the AIS emission control device has a pressure drop of less than about 1 inch H₂O at the air flow rate of about 300 cfm and a % reduction in vapor emission of at least about 75% after one day of the vapor generation rate of about 220 mg/day.

Figure 4:
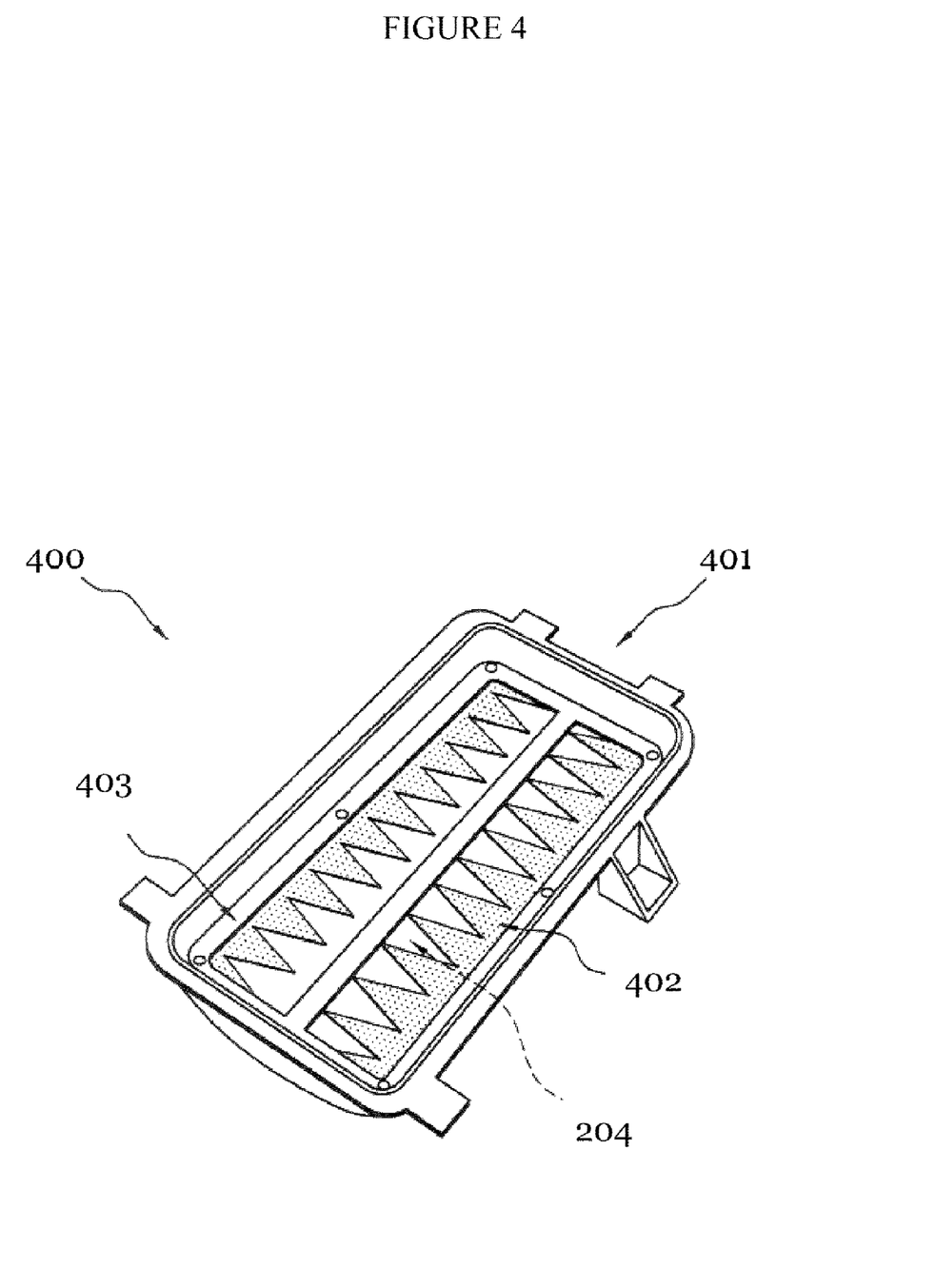
FIG. 4 shows a cross section of one embodiment of the disclosed AIS emission control device, illustrating a lower case with an inlet-opening for an intake air passage; an adsorbent sheet with a teeth pattern positioned on top on the lower case, and a frame securing the adsorbent sheet onto the lower case.

FIG. 4 illustrates the cross section of another embodiment of the disclosed emission control device. In FIG. 4, the adsorbent element 402 includes an adsorbent sheet having a teeth pattern. Similar to the embodiment given in FIG. 3, the adsorbent element 402 is designed to adsorb contaminants from the contaminant-laden air stream during engine-off periods while minimizing pressure drop during periods when the engine is running.

It is to be understood that the first case, the second case, and the adsorbent element of the disclosed AIS emission control system may be in any shape, geometry, or size. Different designs may be chosen to provide a predetermined air flow resistance and adsorbent surface area for the intended applications. The shapes of the upper and lower cases may include, but are not limited to, circular, rectangular, oblong, crescent, and the like.

The adsorbent element may be positioned onto the first case or the second case of the disclosed emission control system through any known affixing techniques. These may include, but are not limited to, gluing, welding, clipping, fastening, and the like.

The contaminants in the laden fluid stream may include, but are not limited to, saturated and unsaturated hydrocarbons utilized in fuels and byproducts caused by combustion; certain carbon oxides such as carbon monoxide, nitrates, sulfides, ozone, and the like; and combinations thereof.

The emission control device of the present disclosure may be for use in removing residual fuel vapor, after the engine has been turned off, from within an engine's intake system or downstream of a throttle body.

The adsorbent sheet suitable for use in the disclosed emission control device may include a variety of known adsorbents. Examples of such absorbents may include, but are not limited to, activated carbon, kaolin, titania, ceria, zeolite, or combinations thereof. The adsorbent sheet may be carbon-loaded paper or any woven or nonwoven material. Examples of the carbon forms suitable for use in the present disclosure may include, but are not limited to, fibers, particulates, and combinations thereof. Activated carbon suitable for use in the present disclosure may be derived from various carbon precursors. These include, but are not limited to, wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables such as rice hull or straw, synthetic polymer, natural polymer, lignocellulosic material, and combinations thereof. Furthermore, the activated carbon may be produced using a variety of processes including, but are not limited to, chemical activation, thermal activation, and combinations thereof.

When desired, the disclosed AIS emission control device may be used in combination with other known AIS emission control devices. Examples of the supplemental AIS emission control device suitable for use with the disclosed device include, but not limited to, a flow-by AIS emission control device including an adsorbent sheet that locates in the air duct, and a flow-through AIS emission control device including an adsorber element that locates in the air duct.

EXPERIMENTS

The disclosed emission control devices with three different levels of activated carbon in the adsorbent elements were tested. In the disclosed emission control devices 300A, the adsorbent element 302 had the activated carbon content of 10.4 g/unit. In the disclosed emission control devices 300B, the adsorbent element had the activated carbon content of 9.3 g/unit. In the disclosed emission control devices 300C, the adsorbent element had the activated carbon content of 8.3 g/unit. The pressure drop and % reduction of the vapor emission for each device were determined and compared to those of the commercial AIS emission control devices used in three automobiles: 2007 Kia Spectra, 2007 Toyota Corolla, and 2008 M5 BMW.

The adsorptivity for fuel vapors was determined using the "Butane Working Capacity" (BWC) test. The tested sample was charged with n-butane at a flow rate of 50 $cm^3$/min for 60 minutes and then weighed. The tested sample was next purged at a flow rate of 300 $cm^3$/min for 40 minutes with dry lab air and weighed. The difference between the two mass measurements was the part BWC. (TABLE 1)

Figure 5:
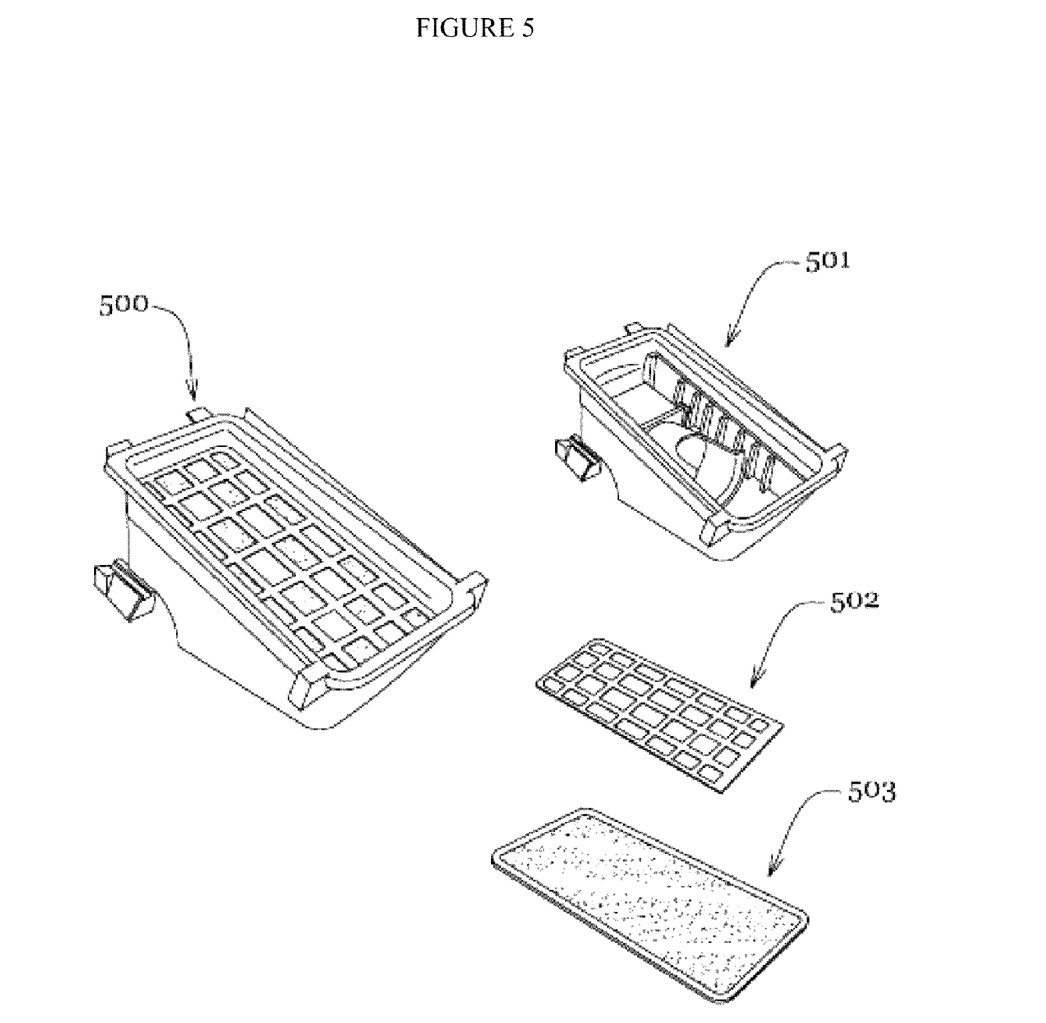
FIG. 5 shows a cross section of an AIS emission control device used in 2007 Kia Spectra.

The cross section of the AIS emission control device used in Kia Spectra is schematically illustrated in FIG. 5. The cross section of device 500 comprises a case 501 having an inlet-opening for an intake air; an activated carbon-coated foam 503, and a frame plate 502 securing the foam 503 to the case 501.

Figure 6:
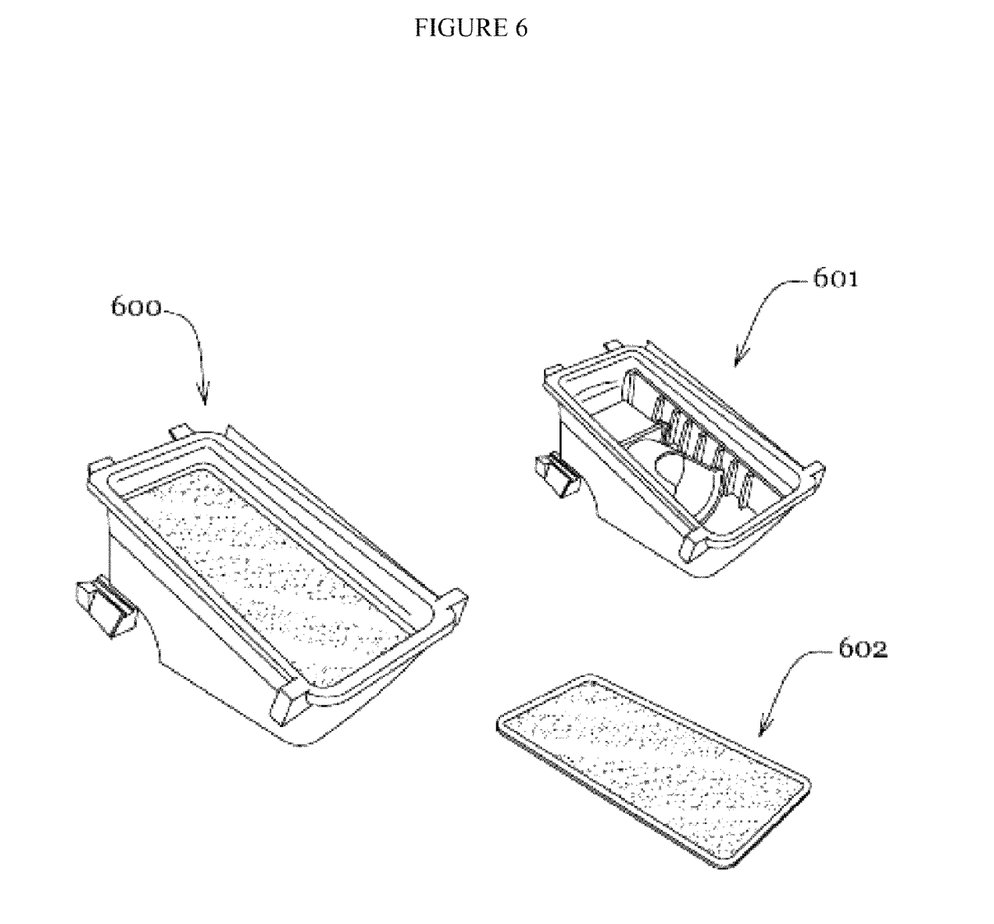
FIG. 6 shows a cross section of an AIS emission control device used in 2007 Toyota Corolla.

The cross section of the AIS emission control device used in 2007 Toyota Corolla is schematically illustrated in FIG. 6. The cross section of device 600 comprises a case 601 having an inlet-opening for an intake air and a panel filter 602 having activated carbon granules or pellets sandwiched between two porous sheets.

Figure 7:
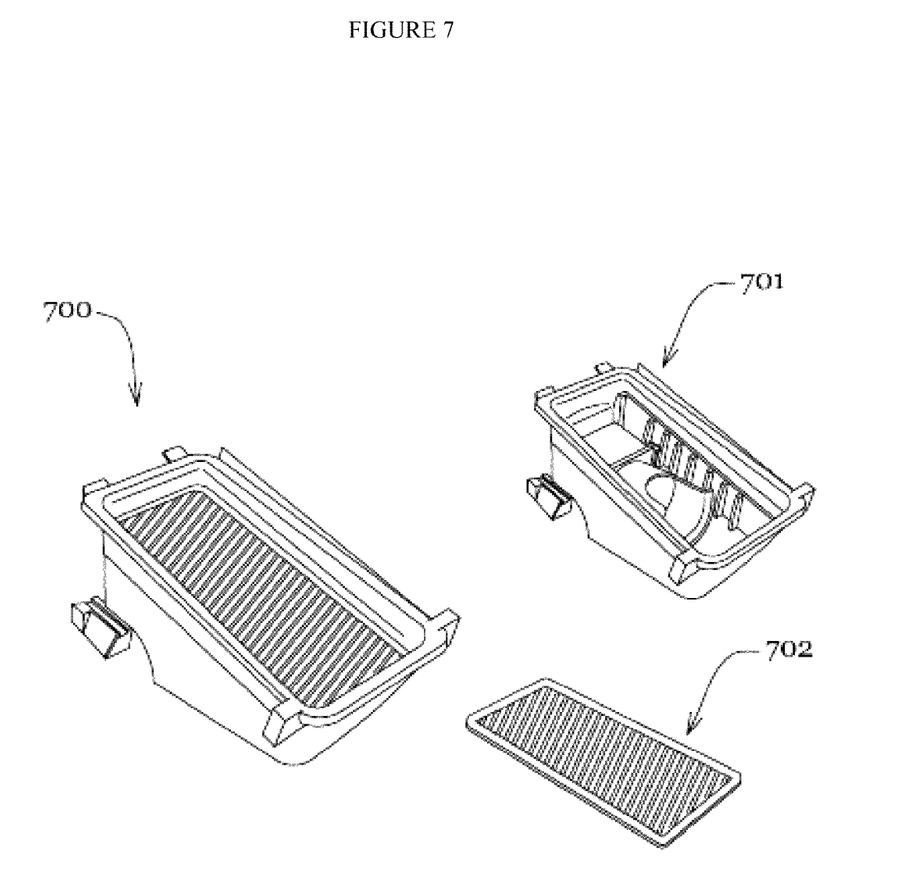
FIG. 7 shows a cross section of an AIS emission control device used in 2008 M5 BMW.

The cross section of the AIS emission control device used in 2008 M5 BMW is schematically illustrated in FIG. 7. The cross section of device 700 comprises a case 701 having an inlet-opening for an intake air and a non-woven pleated filter media 702 containing granular activated carbon.

TABLE 1

| AIS Emission Control Device | BWC (g/unit) | Carbon Content (g/unit) |
| --- | --- | --- |
| Device 300A | 2.8 g/unit | 10.4 g/unit |
| Device 300B | 2.5 g/unit | 9.3 g/unit |
| Device 300C | 2.3 g/unit | 8.3 g/unit |
| 2008 M5 BMW | 4.2 g/unit | Not measurable |
| 2007 Toyota Corolla | 3.6 g/unit | 19 g/unit |
| 2007 Kia Spectra | 2.7 g/unit | Not measurable |

Pressure Drop

Figure 8:
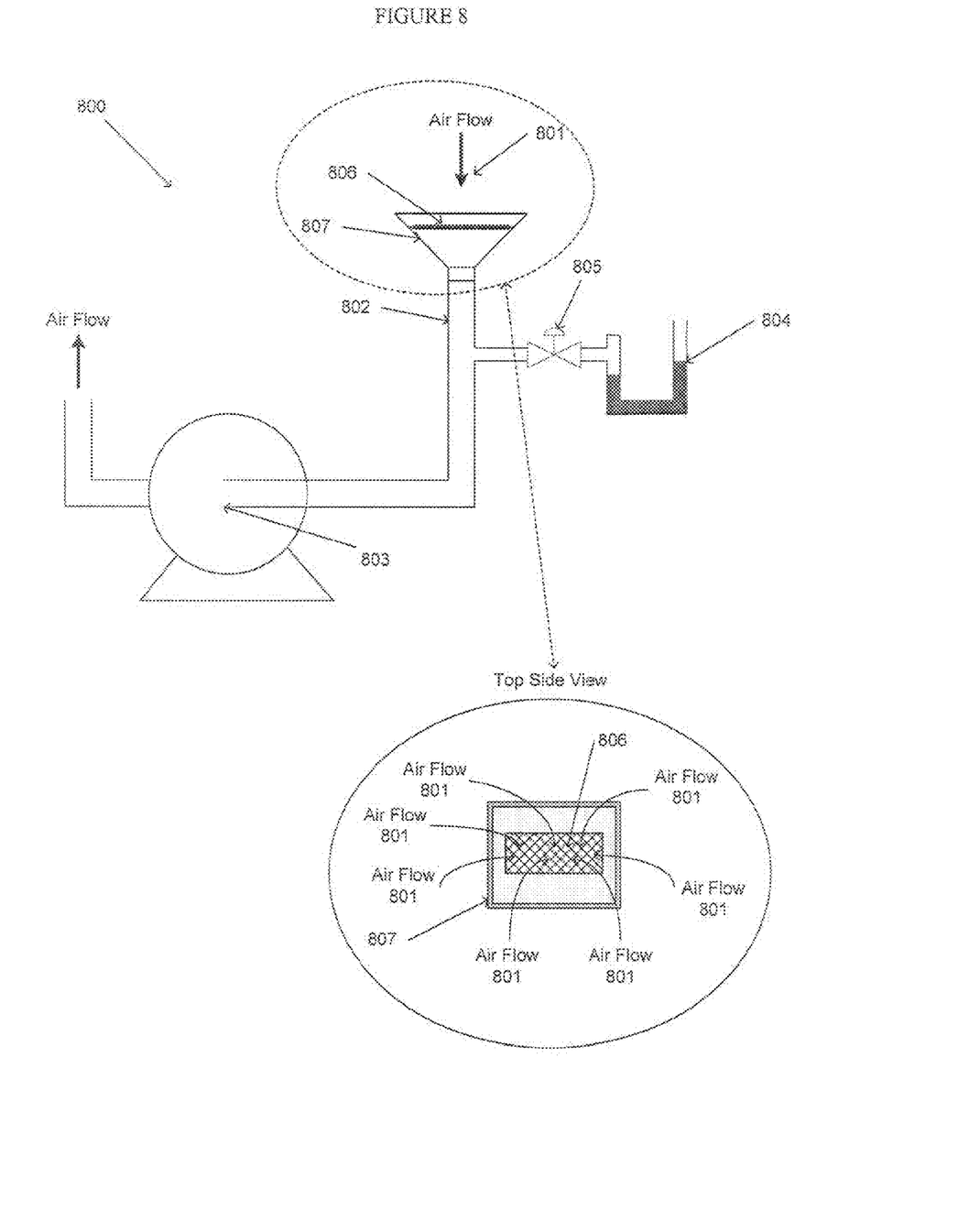
FIG. 8 is a schematic illustration of an apparatus for measuring pressure drop.

FIG. 8 is a schematic illustration of an apparatus used for measuring a pressure drop of the present disclosure. The apparatus 800 has an air inlet 801, a connection to blower 803, an attachment frame 807, and a switch 805 controlling the air flow between the apparatus 800 and a manometer 804. The attachment frame 807 has a center orifice that is custom-sized to the dimensions of the periphery of the specific adsorbent element to be tested. The switch 805 was opened, and then the blower 803 was turned on and adjusted to create a desired airflow rate into the apparatus 800. The pressure levels on the manometer were determined at different airflow rates with the attachment frame 807 installed, but without its corresponding adsorbent element 806. The pressure drop was determined at an ambient temperature. In measuring the pressure drop with an adsorbent element 806, such as the elements 302, 402, 503, 602, and 702 in FIGS. 3-7, the switch 805 was closed, and the tested adsorbent element 806 was placed in the apparatus 800 such that it was located in a plane across the airflow path at the air inlet 801. The periphery of the adsorbent element 806 was sealed to its custom-sized attachment frame 807 such that inlet air would solely flow through the adsorbent element. The switch 805 was opened, and then the blower 803 was turned on and adjusted to create a desired airflow rate into the apparatus 800. The pressure levels on the manometer were determined at different airflow rates. The pressure drop for a given air flow rate was calculated as the difference of pressure levels, indicated by the manometer, with and without the adsorbent element 806 placed in the orifice of its corresponding attachment frame 807.

Figure 9:
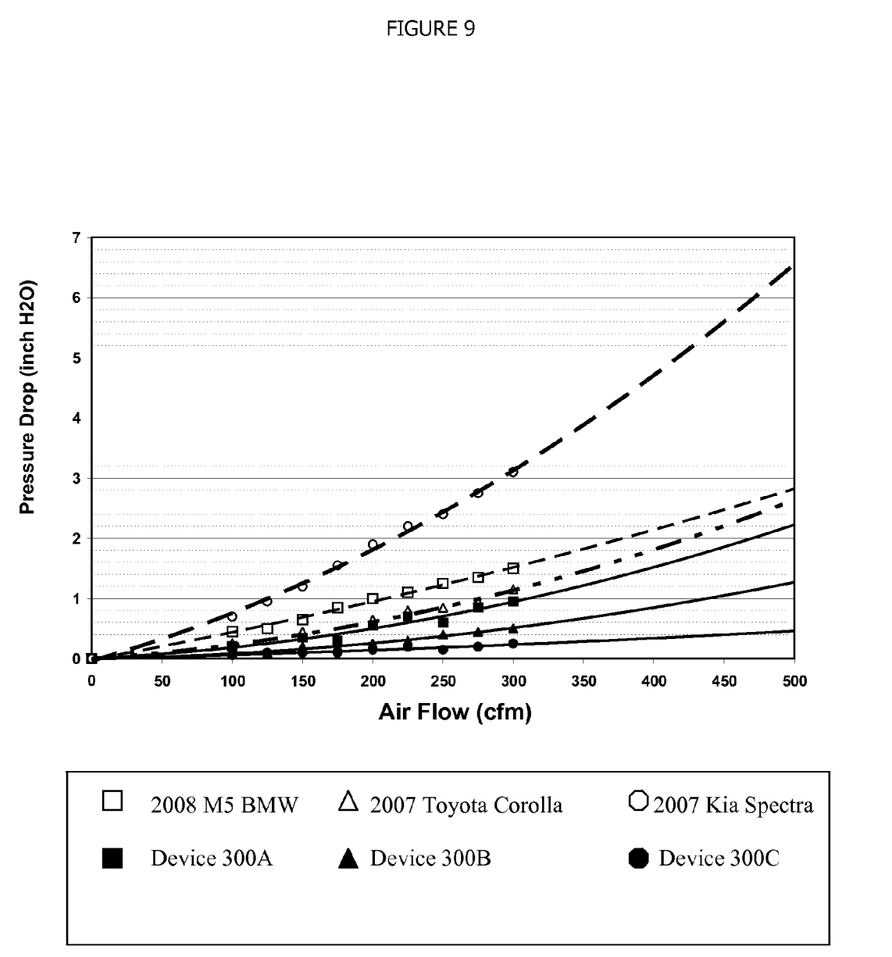
FIG. 9 is a graph showing pressure drop at different air flow rates for different AIS emission control devices.

FIG. 9 shows comparative pressure drop curves of different adsorbent elements at different airflow rates. The disclosed devices 300A, 300B, and 300C showed lower pressure drop compared to the three commercial AIS emission control devices. At the same air flow rate, the pressure drop of the disclosed device 300A was higher than those of the devices 300B and 300C.

TABLE 2

| AIS Control Device | Pressure Drop (inch H2O) @ 300 cfm |
|---|---|
| Device 300A | 0.95 |
| Device 300B | 0.50 |
| Device 300C | 0.25 |
| 2008 M5 BMW | 1.50 |
| 2007 Toyota Corolla | 1.15 |
| 2007 Kia Spectra | 3.10 |

Figure 10:
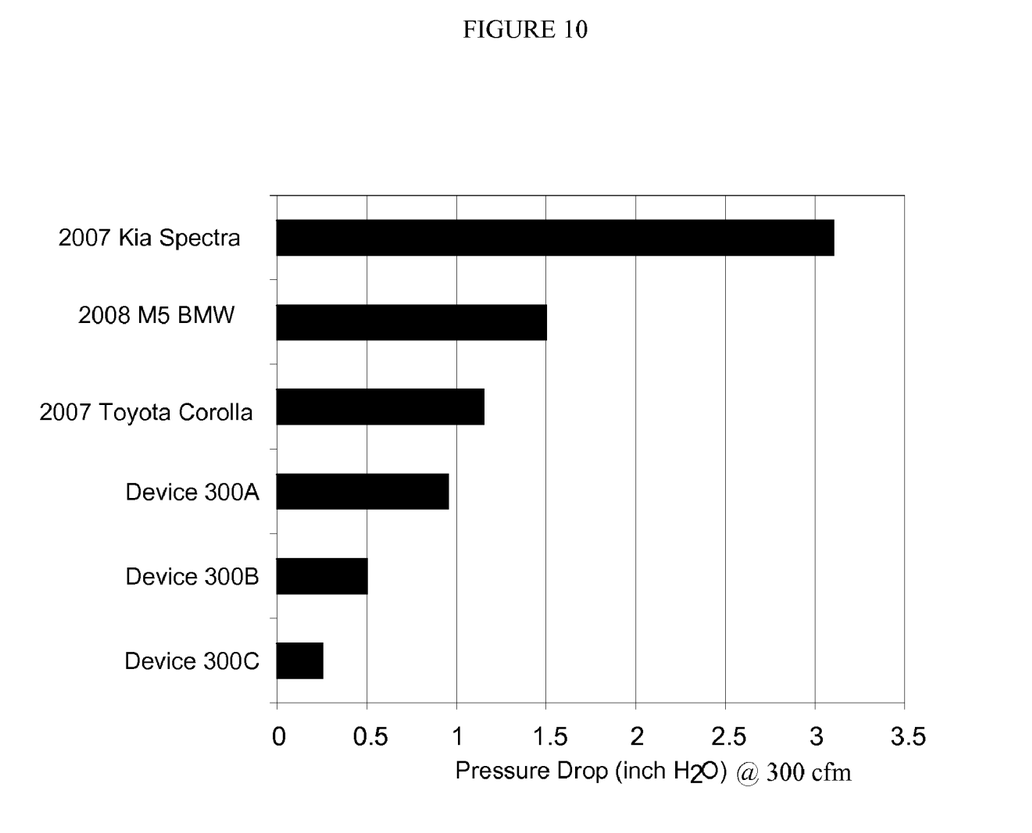
FIG. 10. is a graph showing pressure drop at the air flow rate of 300 cfm for the disclosed AIS emission control devices, compared to the AIS emission control devices commercially used in the automotive industry.

TABLE 2 and FIG. 10 show pressure drops at the flow rate of 300 cfm of the disclosed AIS emission control devices 300A, 300B, and 300C compared to those of commercial AIS emission control devices.

% Reduction in Vapor Emission

Figure 11:
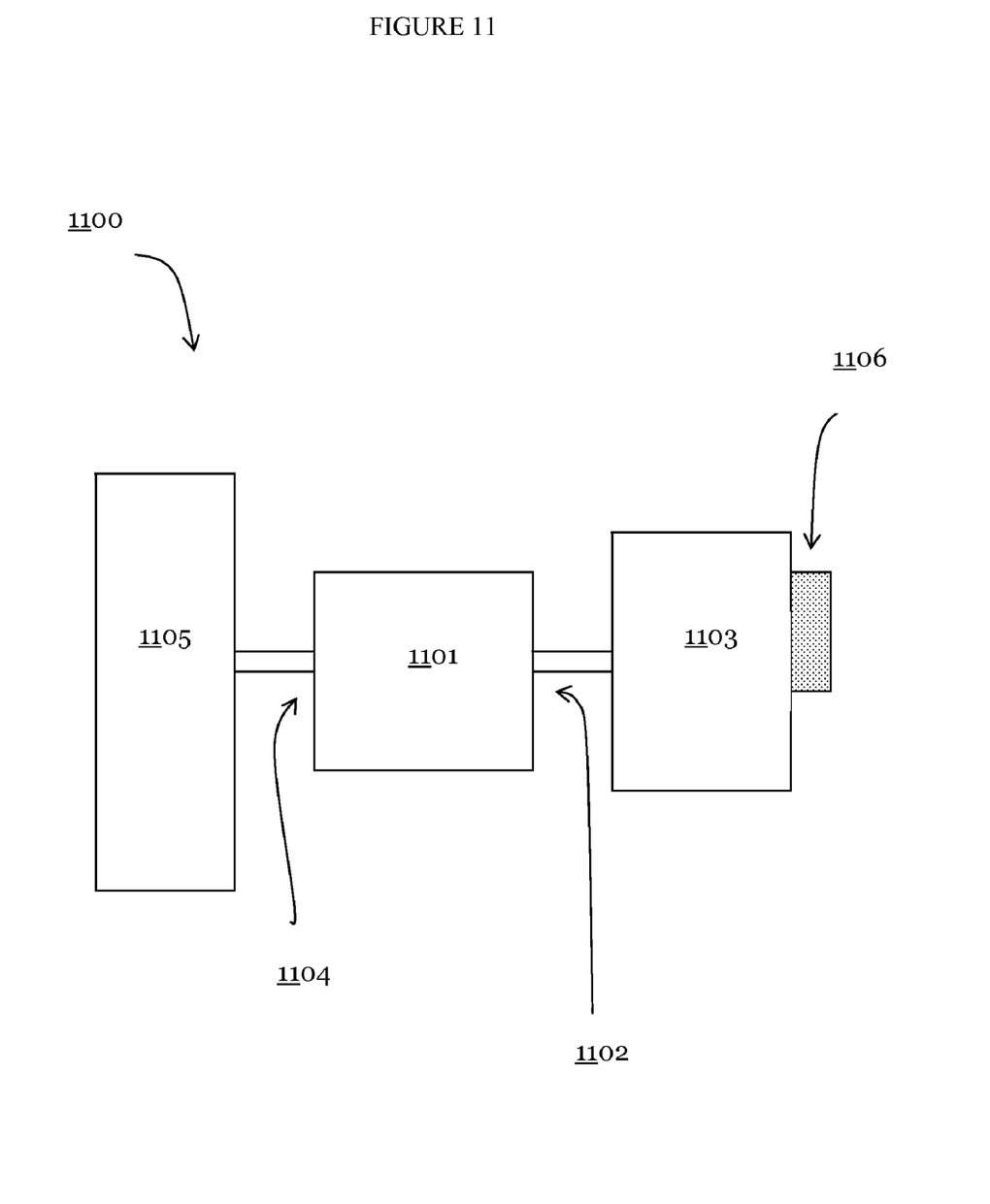
FIG. 11 is a schematic illustration of an apparatus for measuring % reduction of vapor emission.

FIG. 11 shows a schematic figure of the emission testing system used in the present disclosure. An apparatus 1100 comprised an airbox 1101 having a first outlet 1102 connecting to a fuel vapor generator unit 1103, and a second outlet 1104 connecting to a fuel vapor collecting unit 1105 having a volume of 14.55 liter. A thermocouple 1106, as a temperature monitoring instrument, was attached to the vapor generation unit 1103. The system 1100 was placed in a temperature controlled environmental chamber during testing.

Fuel 9 RVP Tier 2 EEE was stabilized at 65° F. for 24 hour prior to the test. The Flame ionization device (FID) was calibrated with different concentrations of n-butane gas. The tested adsorbent element was placed in the airbox 1101 such that fluid flow would occur solely through the adsorbent element. The fuel vapor generator unit 1103 was filled with the temperature-stabilized fuel, and then connected to the outlet 1102 of the airbox 1101. The outlet 1104 was connected to the vapor collecting unit 1105, and the assembled test system was closed from the outside environment.

Figure 12:
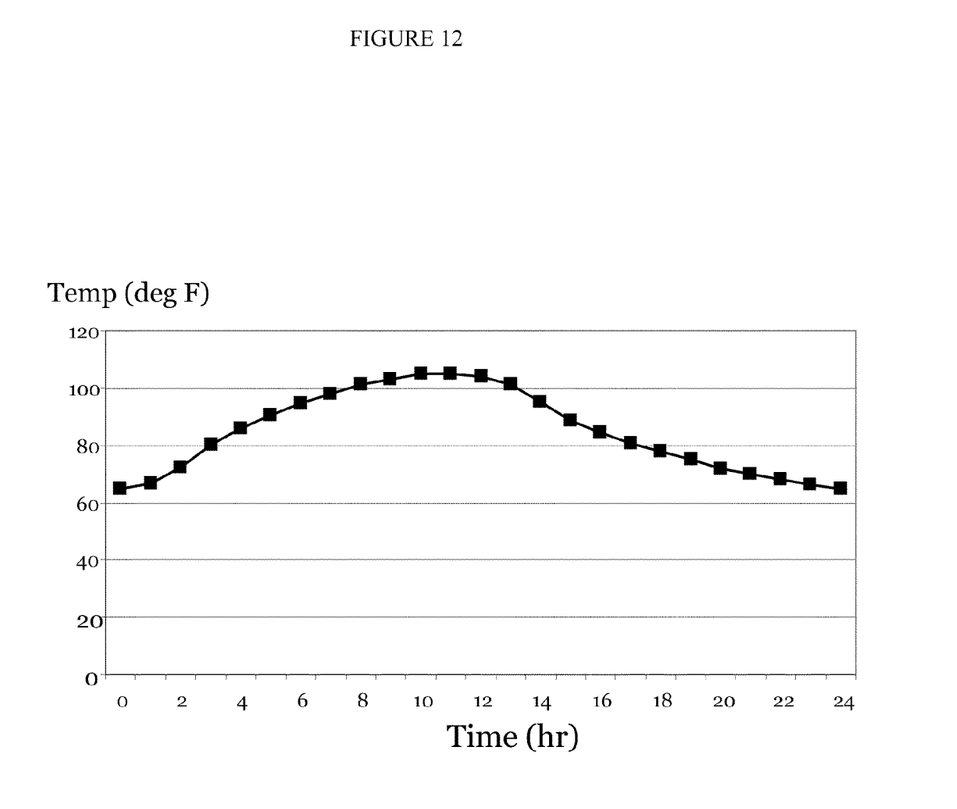
FIG. 12. is a graph showing a diurnal temperature profile as defined by the California Air Resources Board (CARB)

About 80 ml of liquid fuel was placed in the vapor generation unit 1103 such that the vapor generation rate to unit 1105 was about 220 mg/day. The fuel was heated using the diurnal temperature profile as defined by the California Air Resources Board. (FIG. 12) After 1 day, the test system 1100 was disassembled and the vapor collecting unit 1105 was removed. The vapor collecting unit 1105 was then inflated to 14.55 liters and 1.5 inch-$H_2O$ above an ambient pressure. The vapor inside the unit 1105 was evacuated to the calibrated FID device. In the control test, the aforementioned procedure was performed except that there was no hydrocarbon adsorber element in the disclosed emission device.

The amount of vapor collected in milligrams was determined based on the following equation, and this amount was the vapor emission value of the AIS emission control device.

Collected Weight=$[n_{C4} \times Mw_{C4} \times P_{Total} \times V]/RT$, wherein:
$n_{C4}$=Mole percentage of n-butane as determined by the FID device;
$Mw_{C4}$=Molecular weight of n-butane;
P=Ambient pressure+1.5 inch-$H_2O$ pressure;
V=Volume of the vapor collect unit 1105;
R=Gas constant value; and
T=Ambient temperature.

The efficiency of the disclosed emission control device was determined based on the reduction of vapor emitted from the tested device having hydrocarbon adsorber element compared to that emitted from the tested device without the hydrocarbon adsorber element, as shown in the equation:

% Reduction of the Vapor Emission =

(Vapor Emission of Control − Vapor Emission of the AIS Device) ×

100/Vapor Emission of Control

TABLE 3

| AIS Emission Control Device | 1 Day-Vapor Emissions at the vapor generation rate of 220 mg/day (mg) | % Reduction of the Vapor Emission |
|---|---|---|
| Device 300A | 10.6 | 95.2 |
| Device 300B | 42.6 | 80.5 |
| Device 300C | 24.0 | 89.0 |
| 2007 Toyota Corolla | 35.9 | 83.6 |
| 2007 Kia Spectra | 40.4 | 81.5 |
| 2008 M5 BMW | 52.8 | 75.8 |
| Control (No Adsorber) | 218.2 | 0.00 |

Figure 13:
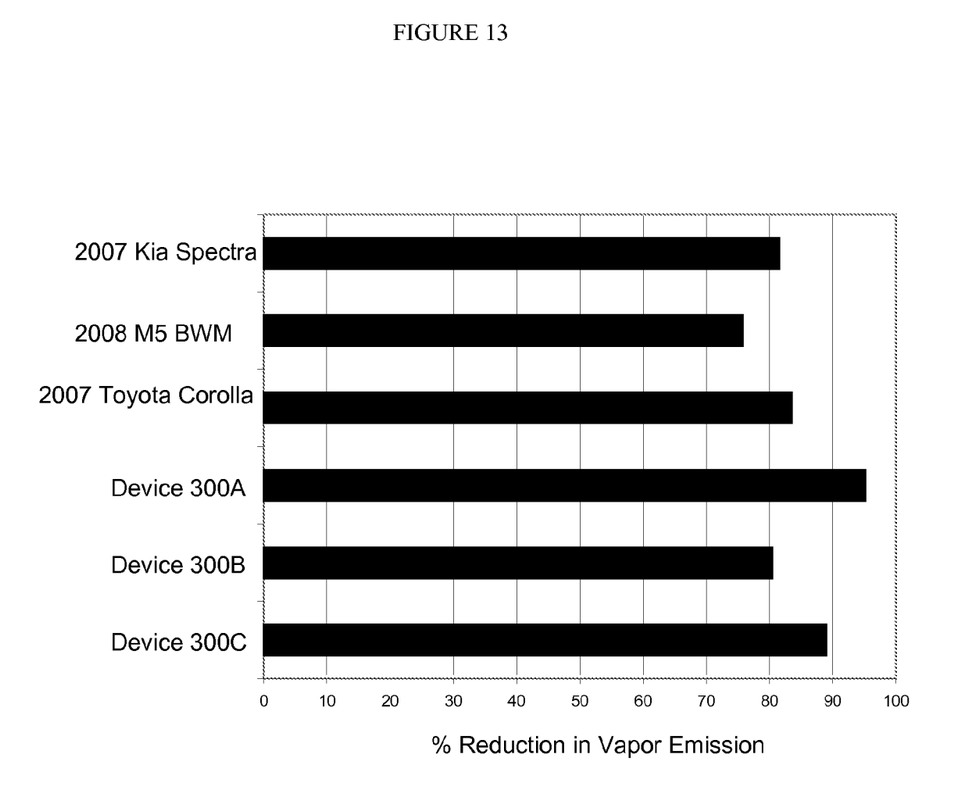
FIG. 13. is a graph showing % reductions of vapor emission for the disclosed AIS emission control devices, compared to the AIS emission control devices commercially used in the automotive industry, after 1 day at a vapor generation rate of 220 mg/day.

TABLE 3 and FIG. 13 showed the % reduction in the vapor emission of the disclosed AIS emission control device compared to the commercially used AIS control devices. The disclosed AIS control devices had higher % reduction in the vapor emission, thus superior adsorption efficiency. The disclosed device 300A showed more than 95% reduction of the vapor emission; whereas, the commercially used AIS control devices showed % reduction in the range of about 75% to about 85%.

Figure 14:
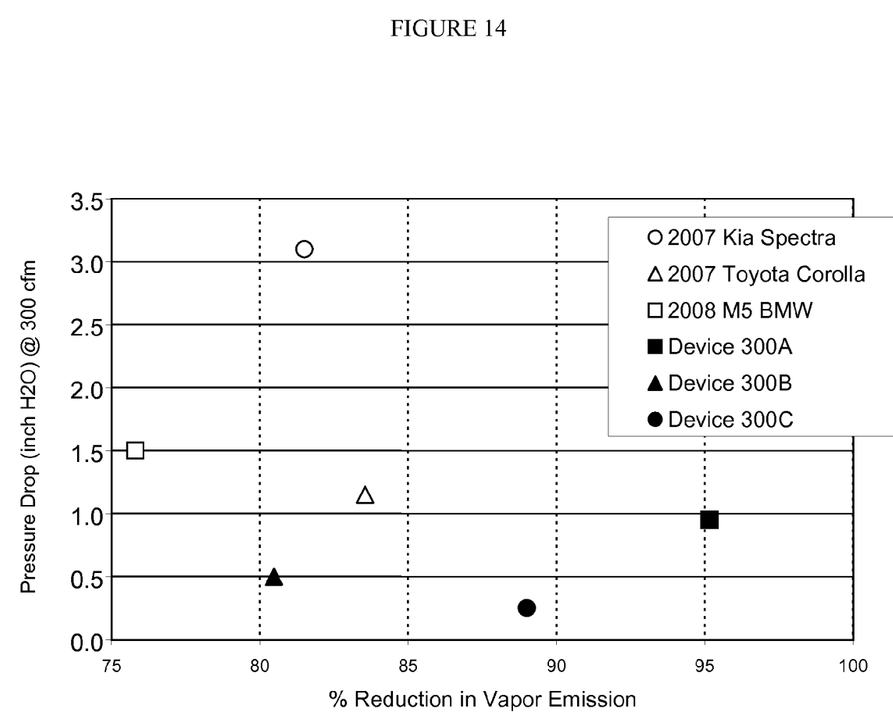
FIG. 14. is a graph showing a relationship, of different AIS emission control devices, between pressure drop at the air flow rate of 300 cfm and a % reduction of vapor emission after 1 day at a vapor generation rate of 220 mg/day.

Low pressure drop and high adsorption efficiency are two critical performance sought after for the AIS emission control device. The disclosed AIS devices showed lower pressure drop, yet superior adsorption efficiency compared to the commercially used AIS emission control devices. (TABLE 4, FIG. 14) The disclosed AIS device had pressure drop of less than about 1 inch $H_2O$ at the air flow rate of about 300 cfm and a % reduction in vapor emission of at least about 75%.

TABLE 4

| AIS Emission Control Device | Pressure Drop @ 300 cfm air flow rate | % Reduction in Vapor Emissions |
|---|---|---|
| Device 300A | 0.95 | 95.2 |
| Device 300B | 0.50 | 80.5 |
| Device 300C | 0.25 | 89.0 |
| 2007 Toyota Corolla | 1.50 | 75.8 |
| 2007 Kia Spectra | 1.15 | 83.6 |
| 2008 M5 BMW | 3.10 | 81.5 |

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

We claim:

1. An emission control device for an air induction system of an internal combustion engine, comprising:
   (a) a first case including an outlet-opening connected to an intake manifold of the engine;
   (b) a second case including an inlet-opening for the intake air; and
   (c) an adsorbent element positioned in a plane across the intake airflow, wherein:
      the adsorbent element includes an opening area such that the device has a pressure drop of less than about 1 inch $H_2O$ at the air flow rate of about 300 cfm and a % reduction in vapor emission of at least about 75% after one day of the vapor generation rate of about 220 mg/day, and
      the adsorbent element is defined by a thickness along a direction of the airflow, the thickness being less than a cross-sectional width of the opening area.

2. The device of claim 1, wherein the device has a pressure drop of less than about 1 inch $H_2O$ at an air flow rate of about 300 cfm and a % reduction in vapor emission of at least about 80% after one day of a vapor generation rate of about 220 mg/day.

3. The device of claim 1, wherein the device has a pressure drop of less than about 0.5 inch $H_2O$ at an air flow rate of about 300 cfm and a % reduction in vapor emission of at least about 75% after one day of a vapor generation rate of about 220 mg/day.

4. The device of claim 1, wherein the device has a pressure drop of less than about 0.5 inch $H_2O$ at an air flow rate of 300 cfm and a % reduction in vapor emission of at least about 80% after one day of a vapor generation rate of about 220 mg/day.

5. The device of claim 1, wherein the device has a pressure drop of less than about 1 inch $H_2O$ at the air flow rate of about 300 cfm and a % reduction in vapor emission in a range of about 75% to about 98% after one day of a vapor generation rate of 220 mg/day.

6. The device of claim 1, further comprising a filter for removing particulate matters.

7. The device of claim 1, further comprising an air passage tube guiding the air flow from the inlet-opening into the adsorbent element.

8. The device of claim 1, wherein the opening area on the adsorbent element has a lattice pattern.

9. The device of claim 1, wherein the opening area on the adsorbent element has a teeth pattern.

10. The device of claim 1, wherein the adsorbent element includes an adsorbent sheet.

11. The device of claim 10, wherein the adsorbent sheet comprises an absorbent selected from the group consisting of activated carbon, kaolin, titania, ceria, zeolite, and combinations thereof.

12. The device of claim 11, wherein a precursor of the activated carbon includes a material selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof.

13. The device of claim 10, wherein the adsorbent sheet includes a member selected from the group consisting of carbon-loaded paper, carbon-loaded woven material, and carbon-loaded nonwoven material.

14. The device of claim 1, wherein the adsorbent element is capable of adsorbing a material selected from the group consisting of hydrocarbons, carbon oxides, nitrates, sulfides, ozone, and combinations thereof.

15. The device of claim 1, further comprising an adsorbent element locating in an air duct that connects the outlet-opening of the first case to the intake manifold of the engine.

16. An internal combustion engine including an emission control device for an air induction system, wherein the device comprises:
   (a) A first case including an outlet-opening connected to an intake manifold of the engine;
   (b) a second case including an inlet-opening for the intake air; and
   (c) an adsorbent element positioned in a plane across the intake airflow, wherein:
      the adsorbent element includes an opening area such that the device has a pressure drop of less than about 1 inch $H_2O$ at the air flow rate of about 300 cfm and a % reduction in vapor emission of at least about 75% after one day of the vapor generation rate of about 220 mg/day, and
      the adsorbent element is defined by a thickness along a direction of the airflow path, the thickness being less than a cross-sectional width of the opening area.

17. A method of controlling a vapor emission from an air induction system of an internal combustion engine after engine shutdown, comprising a step of placing an emission control device between an intake air opening and an intake manifold of the engine, wherein the emission control device comprises:
   (a) a first case including an outlet-opening connected to the intake manifold of the engine;
   (b) a second case including an inlet-opening for the intake air; and
   (c) an adsorbent element positioned in a plane across the intake airflow, wherein:
      the adsorbent element includes an opening area such that the device has a pressure drop of less than about 1 inch $H_2O$ at the air flow rate of about 300 cfm and a % reduction in vapor emission of at least about 75% after one day of the vapor generation rate of about 220 mg/day, and
      the adsorbent element is defined by a thickness along a direction of the airflow path, the thickness being less than a cross-sectional width of the opening area.

* * * * *